United States Patent
Gai et al.

(10) Patent No.: US 7,225,188 B1
(45) Date of Patent: *May 29, 2007

(54) SYSTEM AND METHOD FOR PERFORMING REGULAR EXPRESSION MATCHING WITH HIGH PARALLELISM

(75) Inventors: Silvano Gai, San Jose, CA (US); Dante Malagrino, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 560 days.

This patent is subject to a terminal disclaimer.

(21) Appl. No.: 10/074,616

(22) Filed: Feb. 13, 2002

(51) Int. Cl.
G06F 17/30 (2006.01)

(52) U.S. Cl. .................. 707/6; 707/1; 707/3
(58) Field of Classification Search ............ 707/1–10, 707/100, 200, 101; 711/108
See application file for complete search history.

(56) References Cited

U.S. PATENT DOCUMENTS

| | | | | |
|---|---|---|---|---|
| 5,692,174 | A * | 11/1997 | Bireley et al. ................. 707/3 |
| 5,794,239 | A * | 8/1998 | Walster et al. ................. 707/6 |
| 6,389,507 | B1 * | 5/2002 | Sherman ..................... 711/108 |
| 6,487,666 | B1 | 11/2002 | Shanklin et al. |
| 6,591,331 | B1 * | 7/2003 | Khanna ..................... 711/108 |
| 6,609,205 | B1 | 8/2003 | Bernhard et al. |
| 6,665,725 | B1 * | 12/2003 | Dietz et al. ................. 709/230 |
| 6,735,198 | B1 | 5/2004 | Edsall et al. |
| 6,741,591 | B1 * | 5/2004 | Kaldani et al. ............. 370/389 |
| 6,768,992 | B1 * | 7/2004 | Jolitz ............................ 707/6 |
| 6,785,677 | B1 * | 8/2004 | Fritchman ..................... 707/6 |
| 6,792,546 | B1 | 9/2004 | Shanklin et al. |
| 6,872,237 | B2 | 3/2005 | Gillingham et al. |
| 6,880,087 | B1 | 4/2005 | Carter |
| 6,892,237 | B1 * | 5/2005 | Gai et al. ................... 709/224 |

OTHER PUBLICATIONS

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

* cited by examiner

Primary Examiner—Don Wong
Assistant Examiner—Marcin R. Filipczyk
(74) Attorney, Agent, or Firm—Cesari and McKenna LLP

(57) ABSTRACT

A system and method for searching data strings, such as network messages, for one or more predefined regular expressions is provided. Regular expressions are programmed into a pattern matching engine so that multiple characters, e.g., 32, of the data strings can be searched at the same time. The pattern matching engine includes a regular expression storage device having one or more content-addressable memories (CAMs) whose rows may be divided into sections. Each predefined regular expression is analyzed so as to identify the "borders" within the regular expression. A border is preferably defined to exist at each occurrence of one or more predefined metacharacters, such as ".*", which finds any character zero, one or more times. The borders separate the regular expression into a sequence of sub-expressions each of which may be one or more characters in length. Each sub-expression is preferably programmed into a corresponding section of the pattern matching engine. The system may also be configured so as to search multiple regular expressions in parallel.

35 Claims, 12 Drawing Sheets

600

| | ARC | CURRENT STATE | MATCH | NEXT STATE |
|---|---|---|---|---|
| 602a | 0 -> 1 | 0 | a | 1 |
| 602b | 0 -> 0 | 0 | - | 0 |
| 602c | 1 -> 2 | 1 | b | 2 |
| 602d | 1 -> 1 | 1 | a | 1 |
| 602e | 1 -> 0 | 1 | - | 0 |
| 602f | 2 -> 3 | 2 | c | 3 |
| 602g | 2 -> 1 | 2 | a | 1 |
| 602h | 2 -> 0 | 2 | - | 0 |
| 602i | 3 -> 4 | 3 | c | 4 |
| 602j | 3 -> 3 | 3 | - | 3 |
| 602k | 4 -> 5 | 4 | d | 5 |
| 602l | 4 -> 4 | 4 | c | 4 |
| 602m | 4 -> 3 | 4 | - | 3 |

FIG. 6

| | ARC | CURRENT STATE | MATCH | NEXT STATE |
|---|---|---|---|---|
| 702a | 0 -> 3 | 0 | abc | 3 |
| 702b | 0 -> 2 | 0 | -ab | 2 |
| 702c | 0 -> 1 | 0 | --a | 1 |
| 702d | 0 -> 0 | 0 | --- | 0 |
| 702e | 1 -> 4 | 1 | bcc | 4 |
| 702f | 1 -> 3 | 1 | abc | 3 |
| 702g | | 1 | bc- | 3 |
| 702h | 1 -> 2 | 1 | -ab | 2 |
| 702i | 1 -> 1 | 1 | --a | 1 |
| 702j | 1 -> 0 | 1 | --- | 0 |
| 702k | 2 -> 5 | 2 | ccd | x |
| 702l | 2 -> 4 | 2 | c-c | 4 |
| 702m | 2 -> 3 | 2 | abc | 3 |
| 702n | | 2 | c-- | 3 |
| 702o | 2 -> 2 | 2 | -ab | 2 |
| 702p | 2 -> 1 | 2 | --a | 1 |
| 702q | 2 -> 0 | 2 | --- | 0 |
| 702r | 3 -> 5 | 3 | cd- | x |
| 702s | | 3 | -cd | x |
| 702t | 3 -> 4 | 3 | --c | 4 |
| 702u | 3 -> 3 | 3 | --- | 3 |
| 702v | 4 -> 5 | 4 | cd- | x |
| 702w | | 4 | -cd | x |
| 702x | | 4 | d-- | x |
| 702y | 4 -> 4 | 4 | --c | 4 |
| 702z | 4 -> 3 | 4 | --- | 3 |

| | CURRENT STATE (806) | MATCH (808) | NEXT STATE (810) |
|---|---|---|---|
| 802a | 0 | abcc | 4 |
| 802b | 0 | abc- | 3 |
| 802c | 0 | -abc | 3 |
| 802d | 0 | --ab | 2 |
| 802e | 0 | ---a | 1 |
| 802f | 0 | ---- | 0 |
| 802g | 1 | bccd | x |
| 802h | 1 | abcc | 4 |
| 802i | 1 | bc-c | 4 |
| 802j | 1 | abc- | 3 |
| 802k | 1 | -abc | 3 |
| 802l | 1 | bc-- | 3 |
| 802m | 1 | --ab | 2 |
| 802n | 1 | ---a | 1 |
| 802o | 1 | ---- | 0 |
| 802p | 2 | ccd- | x |
| 802q | 2 | c-cd | x |
| 802r | 2 | abcc | 4 |
| 802s | 2 | c--c | 4 |
| 802t | 2 | abc- | 3 |
| 802u | 2 | -abc | 3 |
| 802v | 2 | c--- | 3 |
| 802w | 2 | --ab | 2 |
| 802x | 2 | ---a | 1 |
| 802y | 2 | ---- | 0 |
| 802z | 3 | cd-- | x |
| 802aa | 3 | -cd- | x |
| 802bb | 3 | --cd | x |
| 802cc | 3 | ---c | 4 |
| 802dd | 3 | ---- | 3 |
| 802ee | 4 | d--- | x |
| 802ff | 4 | cd-- | x |
| 802gg | 4 | -cd- | x |
| 802hh | 4 | --cd | x |
| 802ii | 4 | ---c | 4 |
| 802jj | 4 | ---- | 3 |

FIG. 9

| CURRENT STATE | MATCH | NEXT STATE | OFFSET | |
|---|---|---|---|---|
| 0 | abc----------------------- | 1 | 3 | 902a |
| 0 | -abc---------------------- | 1 | 4 | 902b |
| 0 | --abc--------------------- | 1 | 5 | 902c |
| 0 | ---abc-------------------- | 1 | 6 | 902d |
| 0 | ----abc------------------- | 1 | 7 | 902e |
| 0 | -----abc------------------ | 1 | 8 | 902f |
| 0 | ------abc----------------- | 1 | 9 | 902g |
| 0 | -------abc---------------- | 1 | 10 | 902h |
| 0 | --------abc--------------- | 1 | 11 | 902i |
| 0 | ---------abc-------------- | 1 | 12 | 902j |
| 0 | ----------abc------------- | 1 | 13 | 902k |
| ... | ... | ... | ... | |
| 0 | -------------------abc---- | 1 | 28 | 902l |
| 0 | --------------------abc--- | 1 | 29 | 902m |
| 0 | ---------------------abc-- | 1 | 30 | 902n |
| 0 | ----------------------abc- | 1 | 31 | 902o |
| 0 | -----------------------abc | 1 | 32 | 902p |
| 0 | ------------------------ab | 0 | 30 | 902q |
| 0 | -------------------------a | 0 | 31 | 902r |
| 0 | -------------------------- | 0 | 32 | 902s |
| 1 | cd------------------------ | 2 | 2 | 902t |
| 1 | -cd----------------------- | 2 | 3 | 902u |
| 1 | --cd---------------------- | 2 | 4 | 902v |
| 1 | ---cd--------------------- | 2 | 5 | 902w |
| 1 | ----cd-------------------- | 2 | 6 | 902x |
| 1 | -----cd------------------- | 2 | 7 | 902y |
| ... | ... | ... | ... | |
| 1 | ------------------cd------ | 2 | 26 | 902z |
| 1 | -------------------cd----- | 2 | 27 | 902aa |
| 1 | --------------------cd---- | 2 | 28 | 902bb |
| 1 | ---------------------cd--- | 2 | 29 | 902cc |
| 1 | ----------------------cd-- | 2 | 30 | 902dd |
| 1 | -----------------------cd- | 2 | 31 | 902ee |
| 1 | ------------------------cd | 2 | 32 | 902ff |
| 1 | -------------------------c | 1 | 31 | 902gg |
| 1 | -------------------------- | 1 | 32 | 902hh |

| | CURRENT STATE | MATCH | NEXT STATE | OFFSET | |
|---|---|---|---|---|---|
| 1014 { | 0 | ab_----•••----- | 1 | 3 | 1002a |
| | 0 | -ab_----•••----- | 1 | 4 | 1002b |
| | 0 | ••• | 1 | ••• | |
| | 0 | -----••----ab_- | 1 | 31 | 1002c |
| | 0 | ------•••-----ab_ | 1 | 32 | 1002d |
| | 0 | ------•••------ab | 0 | 30 | 1002e |
| | 0 | ------•••-------a | 0 | 31 | 1002f |
| | 0 | ------•••-------- | 0 | 32 | 1002g |
| 1016 { | 1 | cd---•••-------- | 2 | - | 1002h |
| | 1 | _cd--•••-------- | 2 | - | 1002i |
| | 1 | ••• | 2 | - | |
| | 1 | ___•••___cd- | 2 | - | 1002j |
| | 1 | ___•••___cd | 2 | - | 1002k |
| | 1 | ___•••___c | 1 | 31 | 1002l |
| | 1 | ab_--•••-------- | 1 | 3 | 1002m |
| | 1 | -ab_--•••-------- | 1 | 4 | 1002n |
| | 1 | ••• | 1 | ••• | |
| | 1 | -----••-----ab_- | 1 | 31 | 1002o |
| | 1 | -----••------ab_ | 1 | 32 | 1002p |
| | 1 | ___•••___ | 1 | 32 | 1002q |
| | 1 | -----••--------ab | 0 | 30 | 1002r |
| | 1 | -----••---------a | 0 | 31 | 1002s |
| | 1 | -----••---------- | 0 | 32 | 1002t |

FIG. 10

SYSTEM AND METHOD FOR PERFORMING REGULAR EXPRESSION MATCHING WITH HIGH PARALLELISM

CROSS-REFERENCE TO RELATED APPLICATIONS

This application is related to the following co-pending, commonly owned U.S. Patent Application:

U.S. patent application Ser. No. 09/535,810 entitled, METHOD AND APPARATUS FOR HIGH-SPEED PARSING OF NETWORK MESSAGES, filed Mar. 28, 2000.

BACKGROUND OF THE INVENTION

1. Field of the Invention

The present invention relates generally to the field of computer networks, and more specifically, to a system for performing pattern matching on network messages at high speed.

2. Background Information

Enterprises, including businesses, governments and educational institutions, rely on computer networks to share and exchange information. A computer network typically comprises a plurality of entities interconnected by a communications media. An entity may consist of any device, such as a host or end station, that sources (i.e., transmits) and/or receives network messages over the communications media. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or subnet that may span an entire city, country or continent. One or more intermediate network devices are often used to couple LANs together and allow the corresponding entities to exchange information. A bridge, for example, may be used to provide a "bridging" function between two or more LANs. Alternatively, a switch may be utilized to provide a "switching" function for transferring information between a plurality of LANs at higher speed.

Typically, the bridge or switch is a computer that includes a plurality of ports, which may be coupled to the LANs. The switching function includes receiving data at a source port that originated from a sending entity, and transferring that data to at least one destination port for forwarding to a receiving entity. Conventional bridges and switches operate at the data link layer (i.e., Layer 2) of the communications protocol stack utilized by the network, such as the Transmission Control Protocol/Internet Protocol (TCP/IP) Reference Model.

Another intermediate network device is called a router. A router is often used to interconnect LANs executing different LAN standards and/or to provide higher level functionality than bridges or switches. To perform these tasks, a router, which also is a computer having a plurality of ports, typically examines the destination address and source address of messages passing through the router. Routers typically operate at the network layer (i.e., Layer 3) of the communications protocol stack utilized by the network, such as the Internet Protocol (IP). Furthermore, if the LAN standards associated with the source entity and the destination entity are different (e.g., Ethernet versus Token Ring), the router may also re-write (e.g., alter the format of) the packet so that it may be received by the destination entity. Routers also execute one or more routing protocols or algorithms, which are used to determine the paths along which network messages are sent.

Traffic Management

Computer networks are frequently being used to carry traffic supporting a diverse range of applications, such as file transfer, electronic mail, World Wide Web (WWW) and Internet applications, voice over IP (VoIP) and video applications, as well as traffic associated with mission-critical and other enterprise-specific applications. Accordingly, network managers are seeking ways to identify specific traffic flows within their networks so that more important traffic (e.g., traffic associated with mission-critical applications) can be identified and given higher priority to the network's resources as compared with other less critical traffic (such as file transfers and email). In addition, as computer networks get larger, there is also a need to balance the load going to various servers, such as web-servers, electronic mail servers, database servers and firewalls, so that no single device is overwhelmed by a burst in requests. Popular Web sites, for example, typically employ multiple web servers in a load-balancing scheme. If one server starts to get swamped, requests are forwarded to another server with available capacity.

Layer 4 switches or routers have been specifically developed to perform such services. In a Layer 4 switch, the device examines both the network and transport layer headers of network messages to identify the flow to which the messages belong. Such flows are often identified by examining five network/transport layer parameters (i.e., IP source address, IP destination address, source port, destination port and transport layer protocol). By examining these five parameters, a Layer 4 switch can often identify the specific entities that are communicating and the particular upper layer (e.g., Layer 7) application being used by those entities. In particular, a defined set of well-known port numbers has been established at Request for Comments (RFC) 1700 for certain common applications. For example, port number 80 corresponds to the hypertext transport protocol (HTTP), which is commonly used with WWW applications, while port number 21 corresponds to the file transfer protocol (FTP).

The parsing of data packets so as to identify these network/transport layer parameters is typically performed in software by a dedicated module or library. The Inter-network Operating System (IOS®) from Cisco Systems, Inc. of San Jose, Calif., for example, includes software modules or libraries for performing such packet parsing functions. A processor, such as a central processing unit (CPU), at the network device executes the corresponding program instructions. These modules or libraries may be written in any number of well-known programming languages. The Perl programming language, in particular, is often selected because of its highly developed pattern matching capabilities. In Perl, the patterns that are being searched for are generally referred to as regular expressions. A regular expression can simply be a word, a phrase or a string of characters. More complex regular expressions include metacharacters that provide certain rules for performing the match. The period ("."), which is similar to a wildcard, is a common metacharacter. It matches exactly one character, regardless of what the character is. Another metacharacter is the plus sign ("+") which indicates that the character immediately to its left may be repeated one or more times. If the data being searched conforms to the rules of a particular regular expression, then the regular expression is said to match that string. For example, the regular expression "gauss" would match data containing gauss, gaussian, degauss, etc.

Software modules and libraries can similarly be written to search for regular expressions beyond the five network/transport layer parameters described above. In particular, some enterprises may wish to identify network messages that are associated with applications that have not been assigned a well-known port number. Alternatively, an enterprise may be interested in identifying messages that are directed to a specific web page of a given web site. An enterprise may also wish to identify messages that are directed to or carry a particular uniform resource locator (URL). To identify such messages, an intermediate network device must examine more than just the five network/transport layer parameters described above. In this case, the actual data portions of the message(s) must be parsed for specific patterns, such as selected URLs.

Intrusion Detection

In addition, security is increasingly becoming a critical issue in enterprise and service-provider networks as usage of public networks, such as the Internet, increases, and new business applications, such as virtual private networks (VPNs), electronic commerce, and extranets, are deployed. Many organizations continue to rely on firewalls as their central gatekeepers to prevent unauthorized users from entering their networks. However, organizations are increasingly looking to additional security measures to counter risk and vulnerability that firewalls alone cannot address. Intrusion Detection Systems (IDSs) analyze data in real time to detect, log, and stop misuse or attacks as they occur.

Network-based IDSs analyze packet data streams within a network searching for unauthorized activity, such as attacks by hackers. In many cases, IDSs can respond to security breaches before systems are compromised. When unauthorized activity is detected, the IDS typically sends alarms to a management console with details of the activity and can often order other systems, such as routers, to cut off the unauthorized sessions.

Network-based IDSs are typically configured to monitor activity on a specific network segment. They are usually implemented on dedicated platforms having two primary components: a sensor, which passively analyzes network traffic, and a management system, which displays and/or transmits alarm information from the sensor. The sensors capture network traffic in the monitored segment and perform rules-based or expert system analysis of the traffic using configured parameters. For example, the sensors analyze packet headers to determine source and destination addresses and type of data being transmitted. The sensors may also analyze the packet payload to discover information in the data being transmitted. Once the sensor detects misuse, it can perform various security-related actions, such as log the event, send an alarm to the management console, reset the data connection, or instruct a router to shun (deny) any future traffic from that host or network.

As is the case with intermediate network devices, it is known to incorporate software modules or libraries for analyzing packets within IDS sensors. However, the evaluation of individual packets through software is an impractical solution for both intermediate network devices and IDS sensors which may both be required to analyze enormous volumes of traffic. Today's computer networks can generate hundreds if not thousands of diverse traffic flows at any given time. The use of advanced network equipment, such as fiber optic transmission links and high-speed transmission protocols, such as "Gigabit" Ethernet, further increase the speeds of these traffic flows. Furthermore, regardless of the processing power of the device's CPU (e.g., 16, 32 or even 64 bit), regular expression matching can typically only be performed one byte at a time, due to programming constraints.

Thus, the current software solutions for performing regular expression matching are becoming less efficient at performing their message processing tasks as transmission rates reach such high speeds. Accordingly, a need has arisen for a system that can perform regular expression matching at the high transmission speeds of current and future computer network equipment.

SUMMARY OF THE INVENTION

Briefly, the present invention is directed to a system and method for searching data strings, such as network messages, for one or more predefined regular expressions. In accordance with the invention, the regular expressions are programmed into a pattern matching engine such that multiple characters of the data strings can be searched at the same time. The pattern matching engine preferably includes, among other things, a regular expression storage device for storing the predefined regular expressions and the actions that are to be applied to messages matching those regular expressions, a message buffer for storing the current message(s) being evaluated, and a decoder circuit for inputting the network message or portions thereof to, and for decoding and executing identified actions returned by, the regular expression storage device. The regular expression storage device preferably includes one or more content-addressable memories (CAMs), such as ternary content addressable memories (TCAMs), each having a particular width and a specific number of rows. The rows of the TCAM, moreover, are organized at least logically into a plurality of sections. In the preferred embodiment, the TCAM contains the predefined regular expressions, while the corresponding actions are stored within a second memory device, such as a random access memory (RAM), that is associated with the TCAM.

The process of programming the regular expression storage device includes analyzing each predefined regular expression so as to identify the "border(s)", if any, within the regular expression. In the preferred embodiment, a border is defined to exist at each occurrence of the metacharacters ".*", which finds any character zero, one or more times. The borders separate the regular expression into a sequence of sub-expressions or elements each of which may be one or more characters in length. In accordance with the invention, each TCAM section is loaded with one or more sub-expressions depending on their size and on the width of the TCAM. As each row of the TCAM contains multiple search characters, multiple characters of the data string, preferably 32, can be searched at the same time, i.e., in parallel.

BRIEF DESCRIPTION OF THE DRAWINGS

The invention description below refers to the accompanying drawings, of which:

FIGS. 6–10 are highly schematic, partial representations of the memory structures of the pattern matching engine;

DETAILED DESCRIPTION OF AN ILLUSTRATIVE EMBODIMENT

Figure 1:
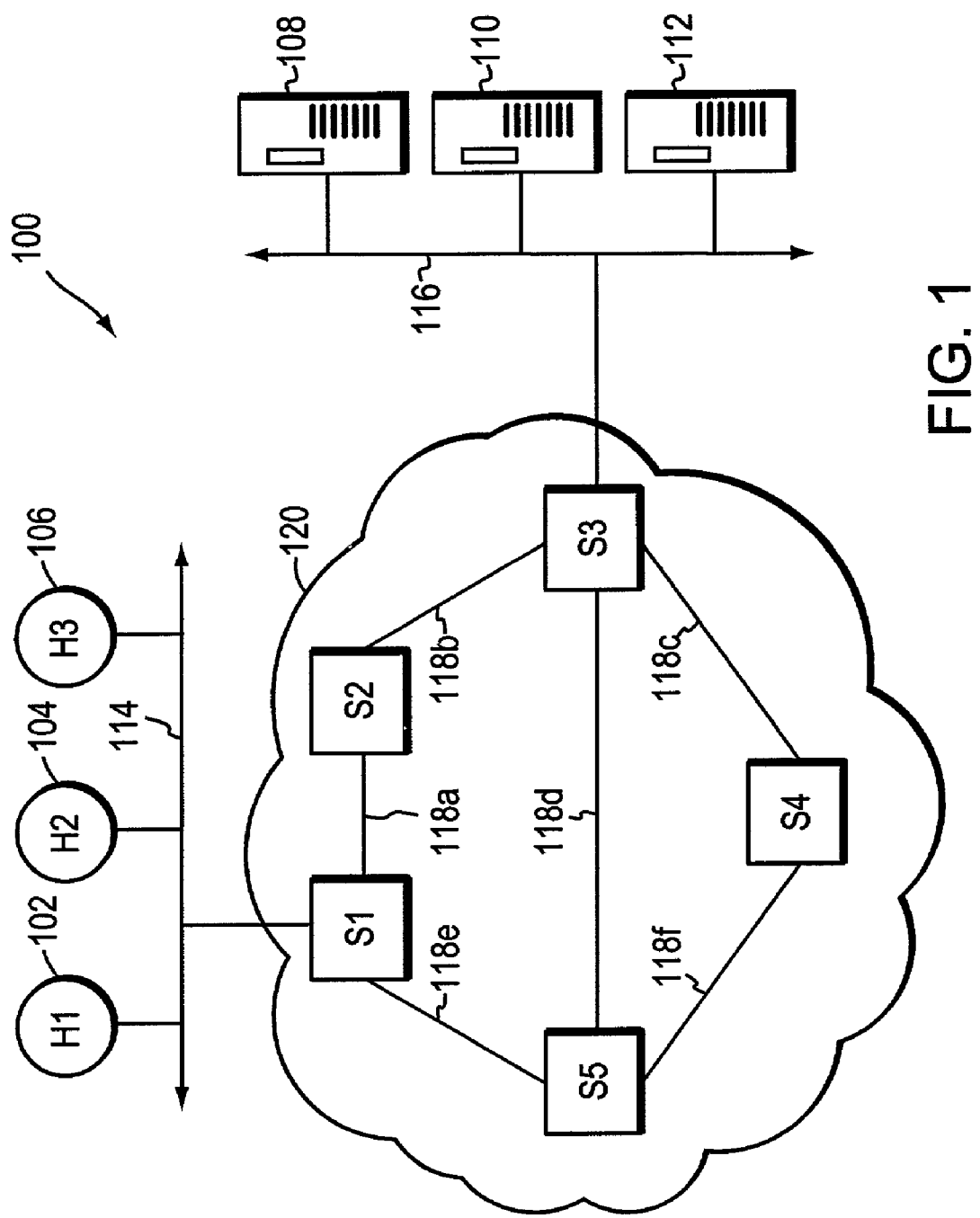
FIG. 1 is a highly schematic block diagram of a computer network.

FIG. 1 is a highly schematic block diagram of a computer network 100 comprising a plurality of stations that are attached to and thus interconnected by a network of communications media. The stations are typically computers, which may include hosts 102–106 (H1–H3), servers 108–112, and intermediate network devices, such as switches S1–S5. Hosts H1–H3 may be personal computers or workstations. Each station of network 100 typically comprises a plurality of interconnected elements including a processor, a memory and a network adapter. The memory, moreover, may comprise storage locations addressable by the processor and the network adapter for storing software programs and data structures. The processor may comprise processing elements or logic for executing the software programs and manipulating the data structures. An operating system, typically resident in memory and executed by the processor, functionally organizes the station by invoking network operations in support of software processes executing on the station.

The communications media of network 100 preferably include one or more local area networks (LANs), such as LAN 114 to which hosts H1–H3 are attached, and LAN 116 to which servers 108–112 are attached. LANs 114 and 116 preferably support communication between attached stations by means of a LAN standard, such as the Token Ring or Ethernet, which are defined by the Institute of Electrical and Electronics Engineers (IEEE) at IEEE standards 802.3 and 802.5, respectively.

Switches S1–S5 are preferably interconnected by a series of point-to-point links 118a–f and arranged as a network cloud 120, which interconnects the hosts H1–H3 on LAN 114 with the servers 108–112 on LAN 116. More specifically, switch S1 is attached to LAN 114 and switch S3 is attached to LAN 116. Thus, outside access to LAN 116, which may be considered a private network, must pass through one or more switches S1–S5 of network cloud 120. Servers 108–112 on LAN 116 are preferably configured to provide one or more services. For example, servers 108 and 10 may be configured as web-hosting servers, while server 112 may be configured as an electronic mail or database server.

Communication among the stations of network 100 is typically effected by generating and exchanging network messages between the communicating stations. That is, a source station may generate one or more discrete packets or segments in accordance with the higher layer protocols of a communications stack and encapsulate those packets or segments in one or more data frames whose format is defined by the LAN standard for the particular communications media to which the source station is attached.

In the preferred embodiment, these higher layer protocols correspond to the well-known Transmission Control Protocol/Internet Protocol (TCP/IP) Reference Model which is described in A. Tanenbaum *Computer Networks* (3rd ed. 1996) at pp. 35–38, among other places. Those skilled in the art will recognize that the present invention may work advantageously with other types of communication standards, such as the Internet Packet Exchange (IPX) protocol, etc.

A network manager responsible for servers 108–112 may wish to identify the particular types of traffic attempting to contact and obtain services from these servers so that appropriate treatments may be applied to that traffic. For example, the network administrator may wish to block outside access to certain web sites and/or web pages hosted by web server 108. Alternatively, the network manager may wish to identify attempts to contact specific web pages at servers 108 and 110 (e.g., electronic commerce pages) so that this traffic may receive higher priority within network cloud 120. The identity of such web pages may be specified by the particular uniform resource locators (URLs) contained in the network messages sent to web servers 108 and 110. Similarly, the network manager may wish to identify the particular application attempting to contact or connect to database server 112 so that traffic corresponding to mission-critical applications (e.g., processing customer invoices) can be given higher priority, while less important applications (e.g., bulk file transfers) can be given lower priority.

As described above, identifying such traffic flows was conventionally performed in software by servers or, in limited circumstances, by network devices. That is, a pattern matching software program would be written, typically in the Perl programming language, to search for a desired regular expression. Network messages received by an intermediate network device, such as a switch, would be passed to the processor which would execute the software program. The processor and memory architectures employed by most network devices often required that the network messages be evaluated one byte at a time. With the increases in transmission speeds through gigabit Ethernet and other high-speed communication standards and the longer network layer station addresses defined by IP version 6 (IPv6), software solutions for parsing network messages are becoming less efficient. As described below, the present invention is directed to a programmable pattern matching engine, preferably implemented as a logic circuit, that is designed to parse the contents of network messages for pre-defined regular expressions and to execute corresponding actions on those messages at high speeds, e.g., at multi-gigabit per second rates.

Figure 2:
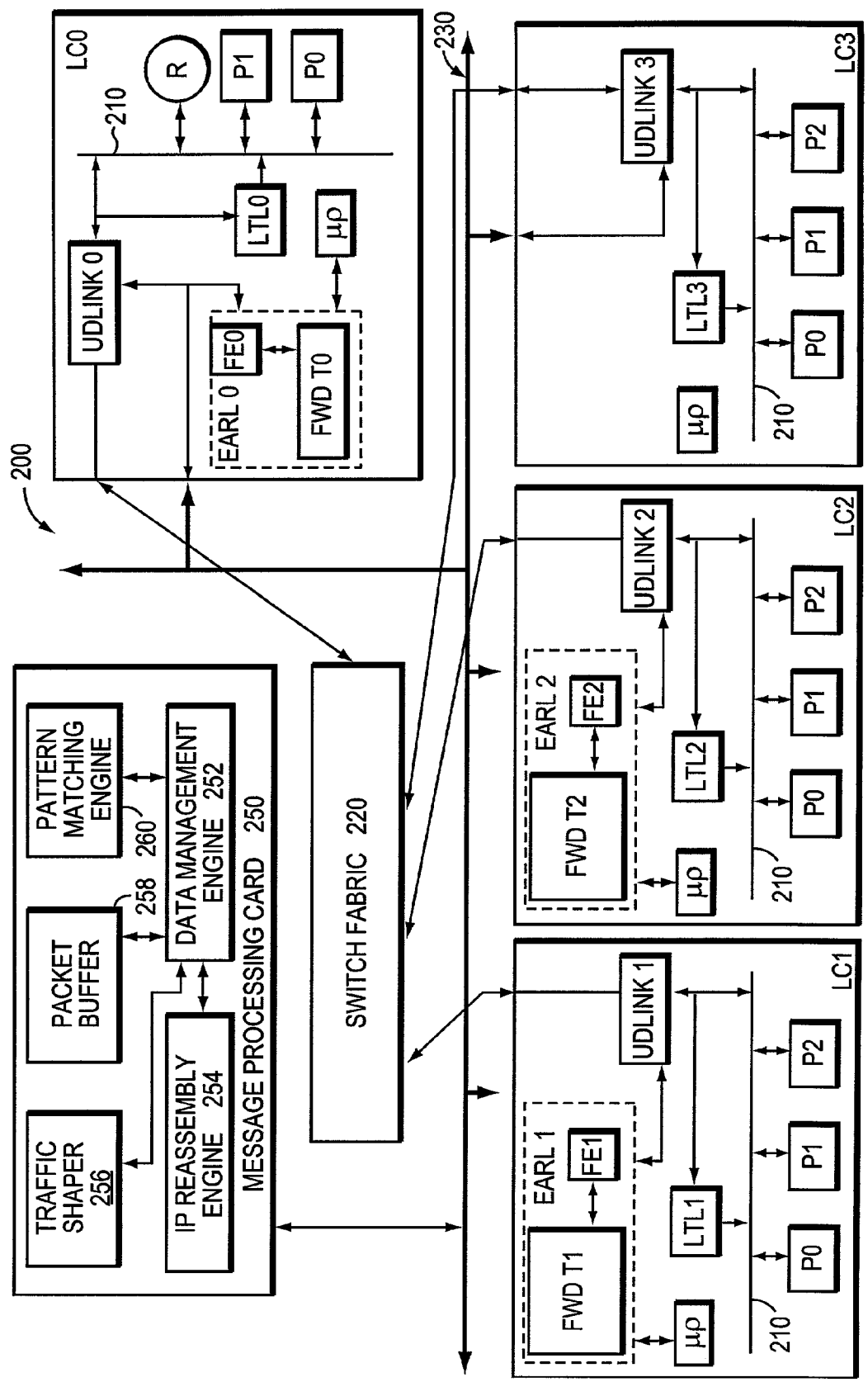
FIG. 2 is a partial functional block diagram of an intermediate network device including a pattern matching engine in accordance with the present invention.

FIG. 2 is a schematic, partial block diagram of switch S1, designated generally as switch 200. The switch S1 is preferably configured as a layer 4/7 switch having a software routing component and hardware components distributed among a plurality of line cards (LC0–3) that are interconnected by a switch fabric 220. One of the line cards, denoted LC0, is a switch management card (SMC) that includes an internal router (R) of the switch. The internal router may be embodied as a routing process executing in the inter-network layer (layer 3) or transport layer (layer 4) of a conventional protocol stack.

Each line card comprises a plurality of ports P (e.g., P0–P2), a local target logic (LTL) memory and an up/down link (UDlink) interface circuit interconnected by a local bus 210. Each line card further contains a microprocessor (μp) in communicating relation with all of its "peer" microprocessors in switch 200 over a management bus (not shown). Some of the line cards may comprise self-contained "mini-switches" that are capable of rendering forwarding decision operations for data frame traffic switched by the fabric 220; that is, forwarding decisions implemented by the switch fabric may be provided by some line cards. Each of these cards includes an encoded address recognition logic (EARL)

circuit coupled to the UDlink and microprocessor. The EARL executes all forwarding decisions for its associated line card(s), while the LTL implements those forwarding decisions by selecting ports as destinations for receiving data (in the form of frames or packets) transferred over the local bus. To that end, the EARL contains forwarding engine circuitry (FE) and at least one forwarding table (FwdT) configured to produce a unique destination port index value.

The switch fabric 220 is preferably a switching matrix employed to control the transfer of data among the line cards of the switch 200. The UDlink provides an interface between the local bus 210 on each line card and the switch fabric 220. Inputs to the LTL logic are received over the local bus 210, which is driven by the UDlink. By employing the UDlink in this manner, a line card (e.g., LC0–2) may include both an EARL circuit and a UDlink or it may share the EARL contained on another line card. In this latter case, a common bus 230 enables a line card without a forwarding engine (e.g., LC3) to use the forwarding engine (e.g., EARL 0) on another line card, such as the SMC. For those line cards without a forwarding engine, the UDlink also provides a connection to the common bus 230.

The format of data between each line card and the switch fabric is generally similar to that employed over the local bus. For example, the format of data transferred from each line card to the switch fabric (hereinafter referred to as a "fabric frame") includes bit mask information instructing the switch fabric 220 where to forward the frame and other information, such as Class of Service (COS) information, used by the switch. This information, which is also included on fabric frames traversing the local bus 20, is embedded within a header of each frame.

Suitable intermediate network device platforms for use with the present invention include the commercially available Catalyst 5000 and 6000 series of switches from Cisco Systems, Inc. of San Jose, Calif., along with the intermediate network device disclosed in copending and commonly assigned U.S. patent application Ser. No. 6,735,198, issued May 11, 2004, and titled, Method and Apparatus for Updating and Synchronizing Forwarding Tables in a Distributed Net-work Switch by Thomas J. Edsall et al.

The layer 4/7 switch S1 (200) preferably functions as a border gateway to private LAN 116 (FIG. 1). In addition, switch S1 may function as a firewall and a load balancer that analyzes higher layer headers (e.g., layer 4 header) and data (e.g., layer 7 application data) of network messages received at the switch 200. In the former case, a firewall engine of switch S1 analyzes the network messages to counter attacks by potential intruders/hackers, whereas in the latter case, a load balancer function analyzes the messages to identify one or more regular expressions, and to direct matching messages to an appropriate server 108–112. Typically, a switch that is configured to perform such higher layer functions implements the regular expression matching processing in software, such as one or more software modules or libraries written in the Perl programming language. As described above, however, such software-based processing can be inefficient and may result in a bottleneck within the switch. The present invention provides a fast packet parsing and pattern matching engine for use in an intermediate network device, such as switch S1, to efficiently perform packet analysis and flow treatment functions. In particular, the engine can parse extension headers (e.g., IPv6 extension headers) and textual messages (e.g., HTML headers), rapidly match regular expressions, and pass relevant fields (e.g., URLs) to other switch components.

To these ends, the common bus 230 of switch 200 further enables the line cards LC0–LC3 to interact with a high-speed message processing card 250 by exchanging data over the bus 230. Message processing card 250 preferably includes, inter alia, a data management engine 252, an IP re-assembly engine 254, a traffic shaper 256, a packet buffer 258, and a pattern matching engine 260. The traffic shaper 256, IP re-assembly engine 254, packet buffer 258 and pattern matching engine 260 are each coupled to the data management engine 252, and control information may be exchanged with engine 260 and the other components of switch 200 through a plurality of predefined type-length-value (TLV) messages.

Figure 3:
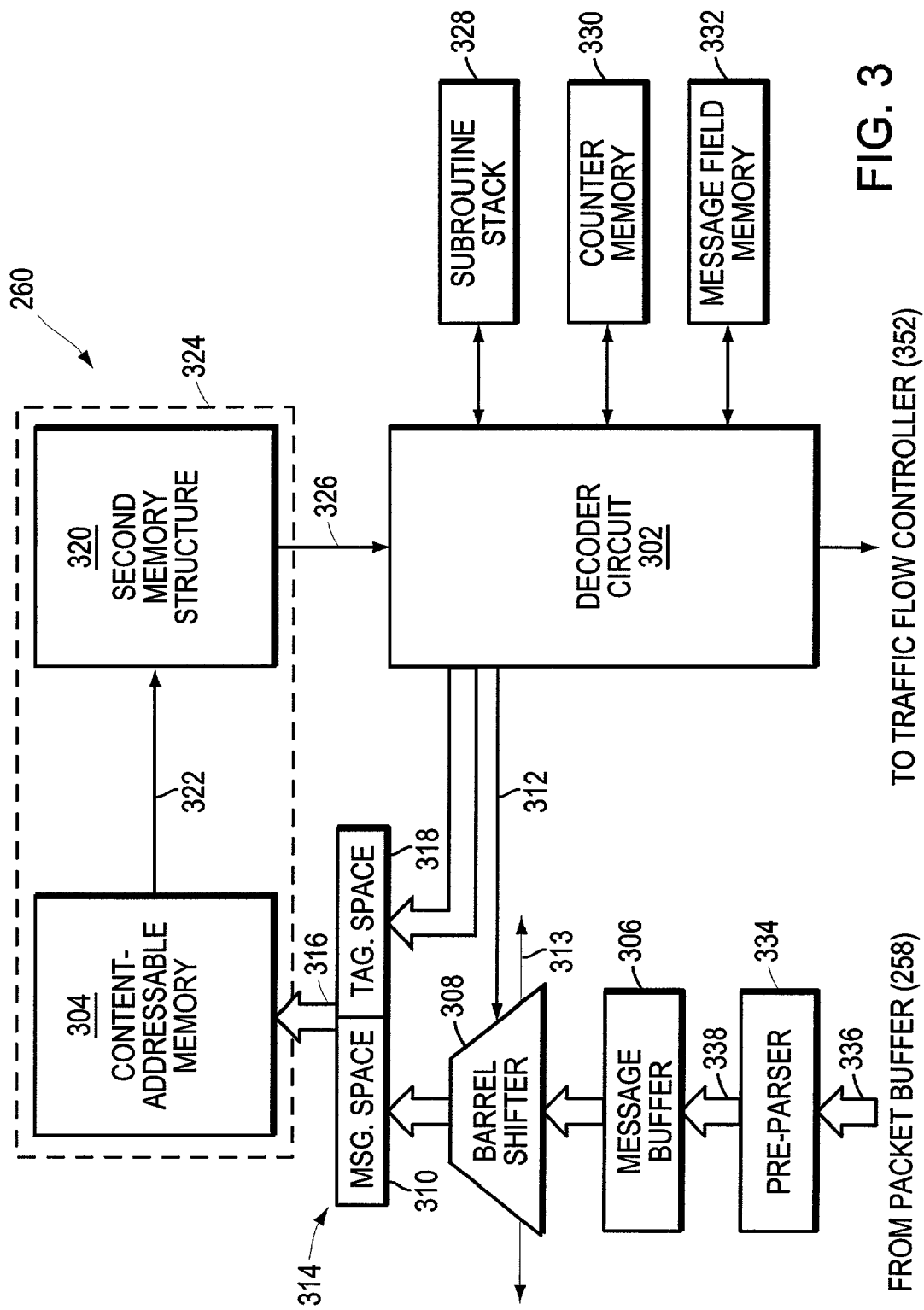
FIG. 3 is a highly schematic block diagram of the pattern matching engine of FIG. 2.

FIG. 3 is a highly schematic block diagram of the pattern matching engine 260 of switch 200 (S1) of FIG. 2. The pattern matching engine 260 preferably includes a de-coder circuit 302 for decoding and executing message-related instructions, and a regular expression storage device 324 having a content-addressable memory (CAM) 304 that can be programmed, as described below, to store at least the regular expression patterns used in searching network messages. The pattern matching engine 260 further includes a message buffer 306 for storing a network message to be evaluated, and a barrel shifter 308 that is connected to the message buffer 306 and operatively controlled by the decoder circuit 302 as illustrated by control arrow 312. The barrel shifter 308 is configured to reveal a selected segment or portion of the message stored in buffer 306 as directed by the decoder circuit 302. Decoder circuit 302 essentially "slides" the barrel shifter 308 along the message buffer 306, as illustrated by double arrow 313, so as to reveal the selected window. The barrel shifter 308 is further coupled to the CAM 304 so as to load the retrieved message portion into a message space 310 of a CAM input 314 that, in turn, is inputted to the CAM 304 as indicated by arrow 316. The CAM input 314 further includes a tag space 318 that is loaded with a tag value as described below by the decoder circuit 302.

In the illustrative embodiment, the regular expression storage device 324 further includes a second memory structure or device 320, such as a random access memory (RAM), that is associated with CAM 304 and programmed, as described below, to contain the actions or treatments that are to be applied to network messages matching the regular expressions contained within the CAM 304. In particular, both the CAM 304 and the RAM 320 include a plurality of information storage entries or rows. Each entry or row of the CAM 304, moreover, includes a pointer that particularly identifies, e.g., addresses, a corresponding entry (i.e., a location) of the RAM 320 as indicated by arrow 322. That is, there is a one-to-one correspondence between CAM entries and RAM entries. The RAM 320, moreover, is configured to provide an output (i.e., the contents of the row or entry identified by the matching CAM entry) to the decoder circuit 302 as indicated by arrow 326. The combination of the CAM 304 and RAM 320 forms the preferred high-speed regular expression storage device 324 of the present invention. To improve performance, pattern matching engine 260 preferably includes multiple (e.g., ten) instances of decoder circuits, message buffers, etc. each processing a different message and each configured to submit inputs to and receive outputs from the CAM 304 and RAM 320. This arrangement allows messages to be processed in pipeline fashion reducing overall message processing time.

The decoder circuit 302 may be further coupled and thus have access to a subroutine stack 328, a counter memory 330 and a message field memory 332. Depending on the action identified by the output from RAM 320, the decoder circuit 302 may interoperate with and thus utilize the facilities offered by one or more of the subroutine stack 328, the counter memory 330 and the message field memory 332. Engine 260 may also include a pre-parser 334 which receives as an input the network message from packet buffer 258 (FIG. 2) as indicated by arrow 336. The pre-parser 334 is preferably a logic circuit that is configured and arranged to extract one or more commonly evaluated fields from the network message in order to speed up the operations of the pattern matching engine 260. The pre-parser 334 preferably prepends these extracted fields to the network message and passes the combination (i.e., network message and appended fields) to the message buffer 306 for storage therein as indicated by arrow 338.

The CAM 304 is preferably a ternary content addressable memory (TCAM) so that the cells (not shown) of each entry or row may be associated with or assigned one of three possible values, "0", "1" or "don't care". A preferred TCAM is 288-bits wide and has 512K rows. To implement the "don't care" value, the TCAM 406 may be segregated into blocks of cells (each cell being either asserted or de-asserted) and a corresponding mask applied to determine whether the particular cells of its block are "care" or "don't care". The TCAM 406 and RAM 320 may be static or dynamic.

Those skilled in the art will recognize that other combinations of hardware components in addition to those specifically described herein may be advantageously utilized to achieve the objectives of the present invention. For example, if TCAMs of sufficient width were reasonably or commercially available, then the associated RAM 320 might be rendered unnecessary. That is, a sufficiently wide TCAM could store both the regular expressions and the corresponding actions or treatments. In that case, the regular expression storage device 324 would simply comprise one or more large TCAMs whose output (i.e., the matching action) would be provided directly to the decoder circuit 302.

The pattern matching engine 260 is preferably formed from one or more Application Specific Integrated Circuits (ASICs) or Field Programmable Gate Arrays (FPGAs). Suitable TCAMs for use with the present invention are commercially available from a number of manufacturers, including Integrated Device Technology, Inc. (IDT) of Santa Clara, Calif., Cypress Semiconductor Corp. of San Jose, Calif., International Business Machines Corp. (IBM) of Armonk, N.Y., NetLogic Microsystems, Inc. of Mountain View, Calif., and Music Semiconductors of Hackettstown, N.J., among others.

Programming the Regular Expression Storage Device

Suppose a network administrator wishes to detect and stop certain network traffic, e.g., requests from host 102, from reaching and/or accessing LAN 116 (FIG. 1). The network administrator may write a regular expression that contains the IPv6 address of host 102. The network administrator may then load this regular expression onto switch S3 for application to network messages attempting to access LAN 116. Suppose the regular expression reads as follows:

.*abc.*cd.* where "a", "b", "c" and "d" each represent an alphanumeric or other character, such as an ASCII character or a data byte (e.g., 8-bits).

Before loading this regular expression into the regular expression storage device 324 at switch S3, it is preferably processed in accordance with the present invention so as to permit multiple characters of the regular expression to be searched or matched in parallel. First, the regular expression is preferably segregated into discrete elements, each of which represents a self-contained or stand-alone sub-expression within the larger regular expression. To aid in the recognition of such stand alone sub-expressions, the regular expression may be represented in Deterministic Finite Automaton (DFA) format. A DFA, which may also be referred to as a deterministic finite state machine, is a finite state machine with exactly one transition for each given symbol and state.

Figure 4:
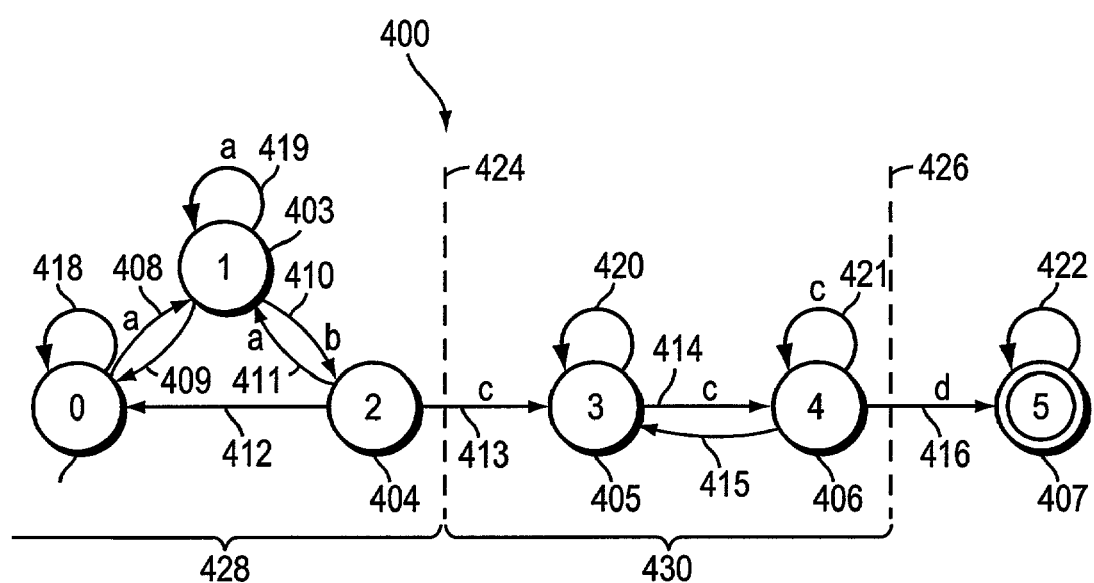
FIGS. 4 and 5 are state diagrams of an exemplary regular expression in Deterministic Finite Automaton (DFA) format.

FIG. 4 is a highly schematic illustration 400 of the above-referenced regular expression in DFA format. The DFA 400 is designed to parse the regular expression one character at a time. It has a plurality of nodes or states 402–407 connected by a series of matching arcs 408–416. Each matching arc 408–416 represents a particular, valid character match, thereby providing a transition to a new state or node. Each state 402–407 represents a part of the regular expression that has already been matched. All nodes have a mismatch arc, such as arcs 418, 409, 412, 420, 415 and 422. The mismatch arcs basically represent a "default" choice which is selected when no other arc constitutes a valid match. Those portions of the DFA illustration 400 across which there are no backward, i.e., right to left, arcs are hereby referred to as "borders". Dotted lines 424 and 426 represent the borders of the DFA 400. The presence of the borders separates the DFA 400 into a sequence of sub-expressions, e.g., sub-expressions 428 and 430. Each sub-expression consists of a sequential sequence of search characters from the original regular expression. Sub-expression 428, in particular, corresponds to a match of the sequential search characters "abc" from the original regular expression, while sub-expression 430 corresponds to a match of the sequential search characters "cd" from the original regular expression.

Figure 5:
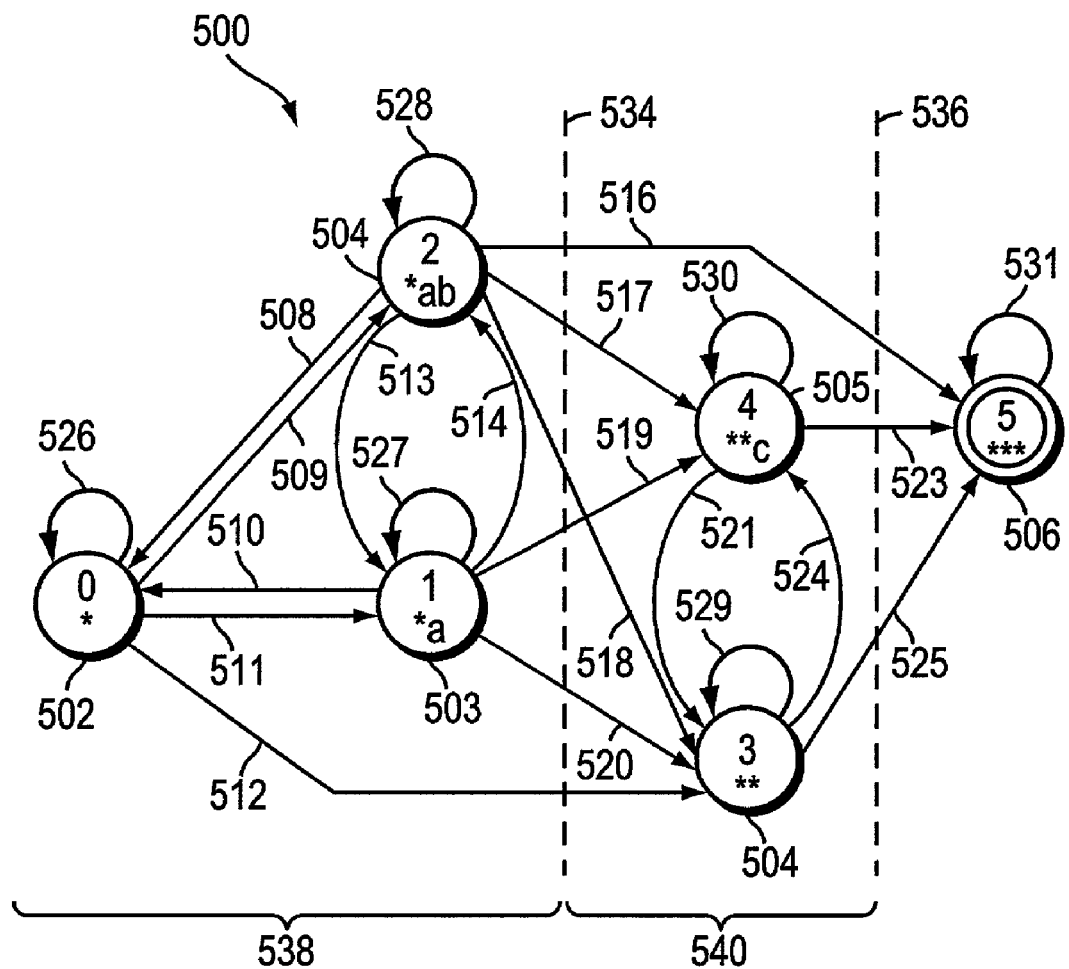

FIG. 5 is another representation 500 of the above-referenced regular expression in DFA format. The DFA 500 similarly has a plurality of nodes or states 502–506 that are interconnected by a plurality of arcs 508–524. Each node 502–506 also includes a mismatch arc 526, 508, 510, 529, 530 and 531. In FIG. 5, however, each arc corresponds to a three character match rather than just a one character match as in FIG. 4. Again, portions of the DFA 500 across which there are no backward arcs constitute borders 534 and 536. The borders, moreover, separate the DFA 500 into a sequence of sub-expressions 538 and 540. As was the case with the DFA 400 of FIG. 4, the first sub-expression 538 corresponds to a match of the sequential characters "abc" from the original regular expression, while the second sub-expression 540 corresponds to a match of the sequential characters "cd".

Applicants have discovered that the borders of a regular expression, which can be used to divide the regular expression into a plurality of sub-expressions, occur at the location of a predetermined sequence of regular expression metacharacters. In particular, the borders occur at each occurrence of the metacharacters ".*". The "." regular expression metacharacter is defined to match any one character. The "*" regular expression metacharacter is defined to match the preceding element zero, ones or more times.

FIG. 6 is a highly schematic representation of a regular expression storage device 600, like the device 324 (FIG. 3), that has been programmed to search data strings, e.g., network messages, for the above-identified regular expression, i.e., ".*abc.*cd.*", one character at a time. As indicated above, device 600 has a plurality of rows 602a–602m. Each row, moreover, corresponds to a row of CAM 304 (FIG. 3). Device 600 also has a plurality of columns, including an arc column 604, a current state column 606, a match column 608 and a next state column 610. In the preferred embodiment, information from the current state column 606 and the match column 608 are loaded into the CAM 304, while the information from the next state column 610 is loaded into RAM 320. The information of column 604 is presented solely to aid in the explanation and understanding of the invention.

The current and next state columns 606 and 610 each contain state variables that have been loaded or programmed into CAM 304 and RAM 320. The state variables may be integers or other values. As shown, each CAM entry includes a current state value and each RAM entry or record specifies a next state value to be used during the next search of CAM 304. In particular, the specified next state value is preferably attached, e.g., appended or prepended, to the next portion of the data string to be searched.

As mentioned above, device 600 has been programmed for searching data strings one character at a time. Accordingly, each row of match column 608 has only a single character, e.g., "a", or a don't care value, which is represented by a hyphen, e.g., ". Rows 602a and 602b, moreover, represent all of the possible matches from state or node 402 (FIG. 4). That is, with reference to FIG. 4, from node 402, a match to "a" corresponds to arc 408, moving the search to the next node, i.e., node 403, which searches for the character "b". Any other match from node 402, i.e., anything other than an "a", corresponds to the mismatch arc 418, keeping the search at node 402. Rows 602c–e similarly represent all of the possible matches from node 403. As shown, once the search reaches rows 602i–j, a border has been crossed and the search will not go back to any of rows 602a–h.

Those skilled in the art will recognize that CAM 304 may be programmed is through a dedicated port (e.g., a Parallel Input/Output port) (not shown), while RAM 320 may be programmed through one or more conventional write operations.

In operation, the tag space 318 of CAM input 314 is first loaded with "0" as the data string is first searched for "a". The message space 310 is loaded with the first character of the data string being analyzed. The contents or value of the tag space 318 are searched against the information stored in the current state column 606, while the contents or value of the message space 310 are searched against the information stored in the match column 608. Because the tag space has been loaded with the value "0", a match can only occur against rows 602a or 602b. Assuming the first character of the incoming string is an "a", a match will occur with row 602a, which, in turn, identifies an entry of RAM 320 at which the next state value, i.e., "1" is stored. This next state value is then loaded into the tag space 318, and the barrel shifter 308 moves to reveal the second character of the data string, which is loaded into the message space 310. This time, a match can only occur with one of rows 602c–602e. Assuming the second character is neither an "a" or a "b", a match will occur with row 602e, and the tag value for use in searching the data string's third character is returned to "0". This process is repeated until either a match of the entire regular expression is found or the entire data string is searched without a match being found.

FIG. 7 is a highly schematic representation of a regular expression storage device 700, like devices 324 and 600. Device 700, however, has been programmed to search data strings for the above-identified regular expression, i.e., ".*abc.*cd.*", three characters at a time. Device 700 includes a plurality of rows 702a–702z corresponding to the rows of CAM 304. Device 700 also includes an arc column 704, a current state column 706, a match column 708 and a next state column 710. In a similar manner as described above, CAM 304 is loaded with the information of columns 706 and 708, while RAM 320 is loaded with the information of column 710.

As indicated above, device 700 is configured to search data strings three characters at a time. Thus, the cells of each row corresponding to column 708 each have three characters. The barrel shifter 308 (FIG. 3), moreover, is configured to slide in increments of three characters, thereby selecting three new characters from the data string for each comparison to device 700.

FIG. 8 is a highly schematic representation of a regular expression storage device 800, like devices 324, 600 and 700, but device 800 has been programmed to search data strings for the above-identified regular expression four characters at a time. Device 800 includes a plurality of rows 802a–802jj corresponding to the rows of CAM 304. Device 800 also includes a current state column 806, a match column 808 and a next state column 810. In a similar manner as described above, CAM 304 is loaded with the information of columns 806 and 808, while RAM 320 is loaded with the information of column 810.

Most cells corresponding to the match columns 708 and 808 of devices 700 and 800 contain multiple, sequential characters from one of the sub-expressions derived for the regular expression. Rows 702a, 702f and 702m (FIG. 7), for example, contain the entire sub-expression 538, i.e., "abc", as do rows 802a–c, 802h, 802r, 802t, and 802u (FIG. 8). Some rows, such as rows 702e, 702k, 802g, 802h, 802p and 802r, contain multiple, sequential characters from both sub-expressions.

As shown, increasing the number of characters being searched at the same time does not change the number of states or nodes of the underlying DFA. Increasing the number of characters being searched does, however, increase the number of arcs in the DFA, since there are more reachable states from a given starting state. Increasing the number of characters being searched by each row of CAM 304 also increases the number of CAM entries that are required in order to cover all of the different possibilities. Depending on the regular expression being searched and the number of characters or bytes being searched at the same time, the corresponding number of entries may exceed the physical number of CAM entries.

Important States

To reduce the number of CAM entries that are required and to decrease the search time, it has been found useful to identify the "important" states of the regular expression. An important state is hereby defined as a state adjacent to a just-crossed border. That is, an important state is immediately to the right of a border. In general, there can be multiple important states in a DFA. Referring to FIGS. 4 and 5, the important states are states 405 and 407 (FIG. 4) and states 504, 505 and 506 (FIG. 5). Accordingly, for the regular expression ".*abc.*cd.*", the important states are ".*abc.*" and ".*abc.*cd.*". In the preferred embodiment, CAM 304 is divided into plurality of sections each having a contiguous set of rows. Each CAM section, moreover, is programmed to search for one of the identified important states. That is, each section of the CAM searches for a complete sub-expression of the predefined regular expression.

FIG. 9 is a highly schematic, partial representation of a regular expression storage device 900, which is similar to the devices 324, 600, 700 and 800 described above. Device 900, however, has been programmed to search data strings for the above-identified regular expression, i.e., ".*abc.*cd.*", 32 characters at a time. Device 900 includes a plurality of rows, such as rows 902a–902hh. For the sake of clarity, some of the rows of device 900 have been omitted. The omitted rows are represented by the "." notation. Again, rows 902a–902hh correspond to the rows of CAM 304. Device 900 also includes a current state column 906, a match column 908, a next state column 910 and an offset column 912. CAM 304 is loaded with the information of columns 906 and 908, while RAM 320 is loaded with the information of columns 910 and 912.

Device 900 is also organized or divided into two sections 914 and 916. As shown, within each section, the CAM entries are set so as to search for a complete match of a corresponding sub-expression. Specifically, section 914, which has been assigned current state "0", searches for a complete match to the first sub-expression, "abc", while section 916, which has been assigned current state "1", searches for a complete match to the second sub-expression, "cd".

If a complete match is found to the sub-expression being searched for, the state is changed and an offset is applied depending on where in the portion of the data string being searched the match was found. Rows 902a–902p of state "0", for example, represent a match to the complete sub-expression "abc". With row 902a, the sub-expression is found at the first three characters of the data string portion being searched. Accordingly, the new state is "1" and the offset is "3" meaning that the barrel shifter 308 moves three characters along the data string to generate a new portion for searching. With row 902p, the sub-expression is found at the last three characters of the data string portion. In this case, the new state is again "1", but the offset if 29. That is, the barrel shifter 308 moves 29 characters along the data string to generate the next portion. Rows 902q and 902r represent partial matches to the sub-expression "abc". In this case, the state remains "0". That is, the state does not change. The offset, moreover, is set so that the next data string portion to be searched starts with the first matching character of the partial match, i.e., "a". Specifically, for row 902q, which matches "ab", the offset is 30, thereby placing "ab" at the head of the next data string portion being searched. For row 902r, which matches only "a" in the last character, the offset is 31, thereby placing "a" at the head of the next data string portion being searched.

Row 902s corresponds to a mismatch for the first sub-expression. A match to row 902s means that the search pattern did not appear anywhere in the 32 characters of the data string portion being searched. In this case, the state remains "0" and the offset is "32". That is, the barrel shifter 308 is directed to obtain the next 32 characters or bytes of the data string for application to device 900.

Section 916 is configured to search for the next sub-expression, i.e., "cd". Rows 902t–ff of section 916 search for a complete match to the sub-expression "cd". Row 902gg searches for partial match, i.e., to "c", and row 902hh corresponds to a complete mismatch.

Since the mismatch condition of rows 902s and 902hh is the most common case when performing Intrusion Detection, programming device 324 in the manner as set forth in FIG. 9 provides high speed analysis of data strings.

As shown, the regular expression storage device 324 can be programmed to match exact patterns of characters (e.g., "abc" and "cd") and to skip indeterminate sequences of characters as represented by the ".*" metacharacters. Device 324 can also be programmed to skip a sequence comprising an indeterminate, but contiguous number of some specified character, such as a space. Suppose a network administrator wishes to search for the following regular expression:

.*ab[ ]+cd.*

Brackets "[ ]" are used to indicate a set of one or more characters to be searched. In the above regular expression, the set of characters inside the brackets is a single space. Thus, the above regular expression searches, in part, for the character string "ab" followed by one or more spaces.

In the preferred embodiment, device 324 is programmed so as to search explicitly for all possible contiguous occurrences of the given character, e.g., the space. That is, device 324 is programmed to search for "ab" followed by one, two, three or more spaces.

FIG. 10 is a highly schematic, partial representation of a regular expression storage device 1000, which is similar to the devices 324, 600, 700, 800 and 900 described above. Device 1000 has been programmed to search data strings for the above-identified regular expression, i.e., ".*ab[ ]+cd.*". The underscore "_" represents a single space. Device 1000 includes a plurality of rows, such as rows 1002a–t. As with FIG. 9, some of the row have been omitted for clarity. The omitted rows are indicated by the " . . . " notation. Device 1000 further includes a current state column 1006, a match column 1008, a next state column 1010, and an offset column 1012. The information of columns 1006 and 1008 are preferably loaded into CAM 304 (FIG. 3), while the information of columns 1010 and 1012 are loaded into RAM 320. The searching of data strings with device 1000 proceeds in a similar manner as described above in connection with device 900.

As shown, with device 1000, the rows 1000a–t of the CAM are programmed so as to search for all possible contiguous occurrences of the character being skipped, e.g., the space. For example, rows 1002a–g, which correspond to a first section 1014, search a plurality of characters, e.g., 32, at a time from a data string for the characters "ab" followed by a single space. If a match is found, a second section 1016 of device is searched. Rows 1002h–k of second section 1016 search for the characters "cd" preceded by zero, one or more contiguous spaces. Row 10021 searches for "c" preceded by a plurality, e.g., 31, contiguous spaces. Rows 1002m–p search for the characters "ab" followed by a single space. Row 1002q searches for all spaces. Rows 1002r and 1002s search for "ab" and "a" at the end of the string, and row 1002t represents a default no match condition.

In addition to skipping an undetermined number of a given character, device 324 is can also be programmed to skip a sequence comprising an indeterminate number of multiple characters, e.g., a space, a tab, a carriage return or a new line. Using the above-described approach, which searches explicitly for all possible contiguous occurrences of the one specified character to be skipped, to multiple characters being skipped would result in combinatorial complexity. Instead, the input string is searched in parallel for all characters that are not part of the sequence being skipped. As soon as one or more characters that are not part of the sequence being skipped are found, this portion of the search is considered complete. That is, once a character different from those being skipped is found, the search proceeds to the next sub-expression. This results in a solution having a linear complexity that can be further optimized by using known minimization tools, such as the Espresso Boolean minimization program developed and available from the Computer Science Department of the University of California at Berkeley.

Searching Multiple Regular Expressions in Parallel

The regular expression storage device 324 can also programmed to search multiple regular expressions at the same time. Suppose, for example, that the following two regular expressions are to be searched:

$$.*\{A\}.*\{B\} \quad (1)$$

$$.*\{C\}.*\{D\} \quad (2)$$

where the variables, A, B, C, and D each represent a sub-expression each consisting of one or more characters.

Figure 11:
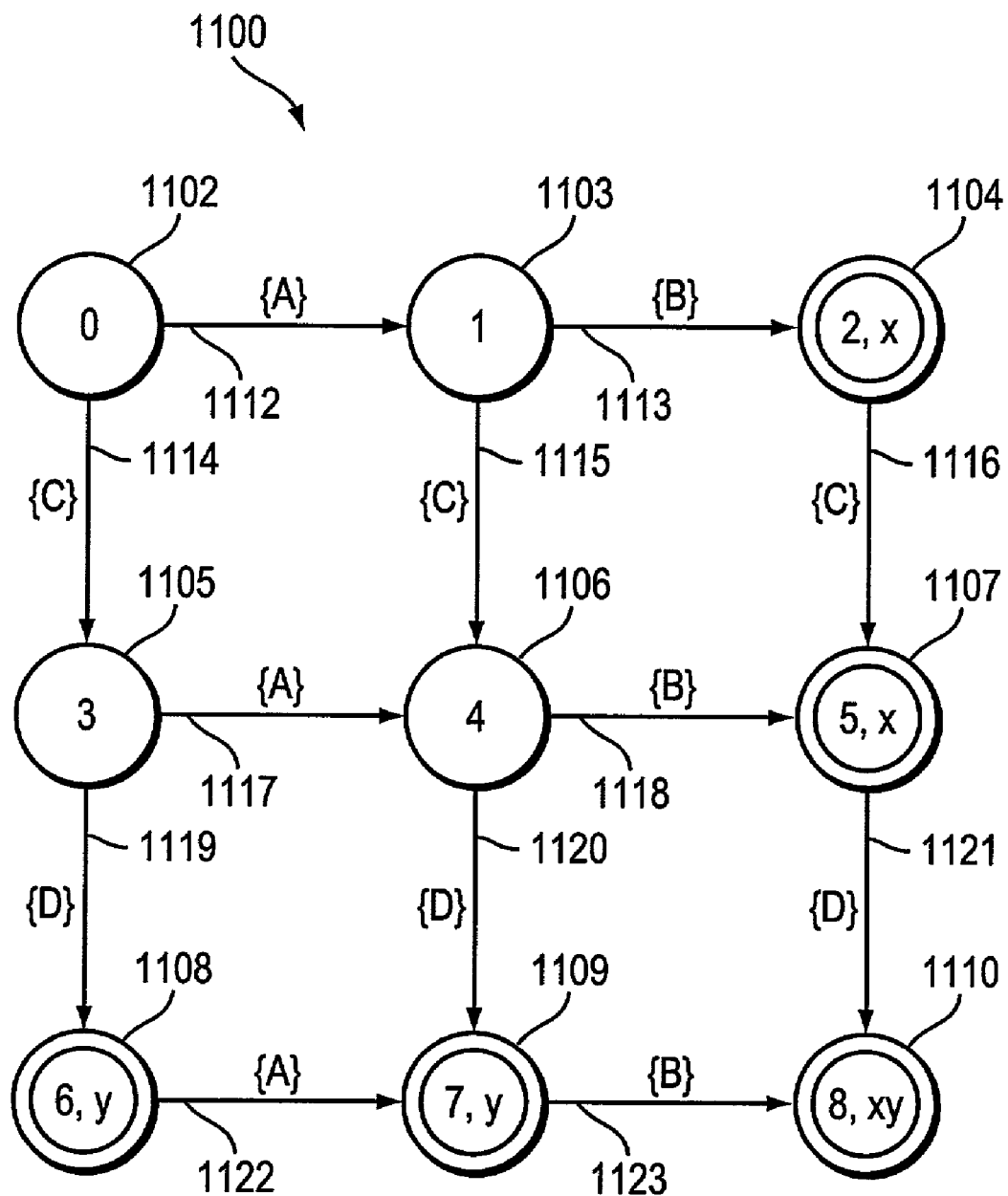
FIG. 11 is a state diagram of two regular expressions in DFA format.

FIG. 11 represents regular expressions (1) and (2) combined into a single DFA 1100. The DFA 1100 has a plurality of nodes or states 1102–1110. The nodes 1102–1110, moreover, are connected by a sequence of arcs 1112–1123 representing matches to the sub-expressions of the two regular expressions. Arcs 1112, 1117 and 1022, for example, represent a match to sub-expression {A}. Arcs 1119, 1120 and 1121 represent a match to sub-expression {D}. Every path through the DFA 1100 starting at node 1102 and ending at node 1110 represents an allowed sequence of sub-expressions that should be searched for in order to match both regular expressions.

It should be understood that there is no reason to search for sub-expressions {B} and {D} unless and until sub-expressions {A} and {C}, respectively, are found.

Figure 12:
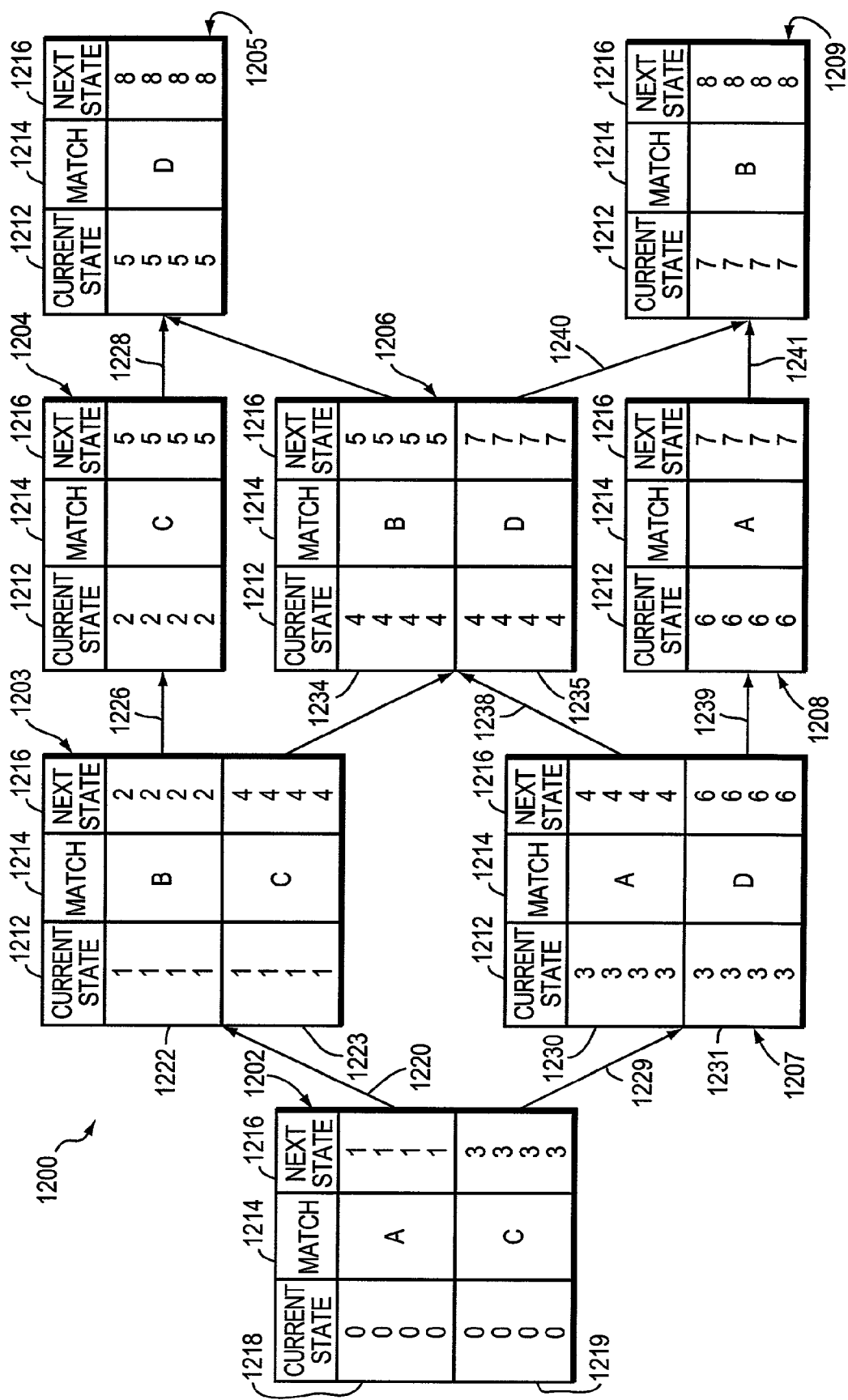
FIG. 12 is a highly schematic, exploded representation of a memory structure of the pattern matching engine for use in searching the two regular expressions of FIG. 11.

FIG. 12 is a highly schematic, exploded view of a regular expression storage device 1200 similar to devices 324, 600, 700, 800, 900 and 1000 described above. Device 1200 is organized or divided into a plurality of sections 1202–1209. Each section 1202–1209 has a plurality of rows (not shown) loaded with patterns for searching one or more sub-expressions. Each section also has a current state column 1212, a match column 1214 and a next state column 1216. In the preferred embodiment, each section also has an offset column (not shown) as described above in connection with FIG. 9.

Section 1202 searches for sub-expressions {A} and {C}. In particular, section 1202 has two sub-sections 1218 and 1219. The rows of sub-section 1218 are preferably loaded in the manner described in connection with FIG. 9 for searching for sub-expression {A}, and the rows of sub-section 1219 are loaded for searching for sub-expression {C}. If a match is found for sub-expression {A} while searching through section 1202, the state is changed to "1" and searching continues in section 1203, as represented by arrow 1220. Section 1203 has two sub-sections 1222 and 1223. The rows of sub-section 1222 are loaded for searching for sub-expression {B} and the rows of sub-section 1223 are loaded for searching for sub-expression {C}. If a match is found to sub-expression {B} in section 1203, the state is changed to "2" and searching continues in section 1204, as indicated by arrow 1226, which searches for sub-expression {C}. If a match is found to sub-expression {C} in section 1204, the state is changed to "5" and searching continues in section 1205, as indicated by arrow 1228, which searches for sub-expression {D}. That is, section 1205 is loaded in the manner described above for FIG. 9 to search for sub-expression {D}.

Returning to the first section 1202, if a match is found to sub-expression {C}, then the state is changed to "3", and searching continues in section 1207, as indicated by arrow 1229. Section 1207 also has two sub-sections 1230 and 1231, the first for searching for sub-expression {A} and the second for searching for sub-expression {D}. Depending on the pattern, if any, that is found while searching through section 1207, searching may continue through one or more of sections 1206, 1208 and 1209, as indicated by arrows 1238–1241. Section 1206 has two sub-sections 1234 and 1235, which have been loaded for searching for sub-expressions {B} and {D}, respectively. Sections 1208 and 1209 have been loaded for searching for sub-expressions {A} and {B}, respectively. Each path among the sub-sections 1202–1209 represents an allowed sequence of sub-expressions that should be searched for in order to match both regular expressions.

It should be understood that all of the sections 1202–1209 may be disposed in a single regular expression storage device 324. More specifically, the information of columns 1212 and 1214 may be stored in the CAM 304, and the information from column 1216 may be stored in RAM 320. Alternatively sections 1202–1209 may be distributed across a plurality of CAMs and/or RAMs.

It should be further understood that the pattern matching engine 260 may be utilized in an intermediate network device to perform Quality of Service (QoS) or load balancing, among other functions. The engine 260 may also be implemented in the sensor of an IDS to search for unauthorized access attempts, hackers or security breaches. Engine 260 may also be used to search for regular expressions in other systems.

The foregoing description has been directed to specific embodiments of this invention. It will be apparent, however, that other variations and modifications may be made to the described embodiments, with the attainment of some or all of their advantages. For example, the techniques of the present invention may be applied to searching email for virus signature strings. Therefore, it is an object of the appended claims to cover all such variations and modifications as come within the true spirit and scope of the invention.

What is claimed is:

1. A method for operating a pattern matching engine having a plurality of information storage entries with two or more regular expressions, each regular expression including a plurality of characters and each regular expression associated with a corresponding action to be applied when matching strings are found, the method comprising the steps of:

identifying one or more borders within each regular expression, the one or more borders separating the regular expression into a plurality of sub-expressions, each sub-expression having a plurality of sequential characters;

loading each entry of the plurality of entries of the pattern matching engine with the plurality of the sequential characters from one of the sub-expressions of the plurality of sub-expressions, wherein the borders are defined by a predetermined sequence of regular expression metacharacters, and the entries stored in content addressable memory (CAM);

applying a string from a network message to the entries of the pattern matching engine to search the string simultaneously in parallel for sub-expressions from each of the two or more regular expressions;

determining that the sub-expressions of at least one regular expression match the string; and executing the corresponding action associated with that at least one regular expression on the network message.

2. The method of claim 1 wherein the predetermined sequence of regular expression metacharacters is a first regular expression metacharacter defined to match any one character of the plurality of sequential characters from one of the sub-expressions followed immediately by a second regular expression metacharacter defined to match the one character zero, one, or more times.

3. The method of claim 1 further comprising a step of organizing at least part of the pattern matching engine into a plurality of sections, and wherein each section of the pattern matching engine is loaded with a plurality of search patterns for a corresponding sub-expression.

4. The method of claim 3 wherein the plurality of search patterns of a section are loaded with a search pattern that includes a complete match of a respective sub-expression, a search pattern that includes a partial match of the respective sub-expression, and a mismatch pattern.

5. The method of claim 4 further comprising the steps of:
associating at least one sub-expression with a current state variable; and
loading the associated current state variable into each entry of a section of the pattern matching engine that contains the at least one sub-expression.

6. The method of claim 1 wherein
the CAM is a ternary content addressable memory, a TCAM, that supports don't care values, and
each regular expressions loaded to the CAM has a plurality of search patterns including a mismatch pattern having don't care values.

7. The method of claim 6 wherein each entry of the TCAM identifies a corresponding entry of a second memory device.

8. The method of claim 7 wherein at least one TCAM entry is associated with a next state variable, the method further comprising the step of loading an entry of the second memory device that is identified by the at least one TCAM entry with the associated next state variable.

9. The method of claim 8 wherein
the at least one TCAM entry is located in a TCAM section whose entries are associated with a current state variable having a first value, and
the next state variable has a second value that differs from the first value, wherein the next state variable specifies a new TCAM section to be searched.

10. The method of claim 9 wherein each TCAM entry has a match cell that contains the complete match, the partial match or the mismatch pattern.

11. The method of claim 1 wherein
the pattern matching engine further includes a second memory device having a plurality of entries, and
the entries of the second memory device are loaded with the corresponding actions associated with the two or more regular expressions.

12. An apparatus comprising:
means for pattern matching having a plurality of information storage entries with two or more regular expressions, each regular expression including a plurality of characters and each regular expression associated with a corresponding action to be applied when matching strings are found;
means for identifying one or more borders within each regular expression, the one or more borders separating the regular expression into a plurality of sub-expressions, each sub-expression having a plurality of sequential characters;
means for loading each of the plurality of entries of the means for pattern matching with the plurality of sequential characters from one of the sub-expressions of the plurality of sub-expressions, the entries stored in content addressable memory (CAM);
means for applying a string from a network message to the entries of the pattern matching engine to search the string simultaneously in parallel for sub-expressions from each of the two or more regular expressions;
means for determining that the sub-expressions of at least one regular expression match the string; and
means for executing the corresponding action associated with that at least one regular expression on the network message.

13. The apparatus of claim 12, further comprising:
means for organizing at least part of the CAM into a plurality of sections, and wherein each section of the CAM is loaded with a plurality of search patterns for a corresponding sub-expression.

14. The apparatus of claim 12, further comprising:
means for associating at least one sub-expression with a current state variable; and
means for loading the associated current state variable into each entry of the CAM that contains the at least one sub-expression.

15. The apparatus of claim 12, further comprising:
means for including at the pattern matching engine a memory device having a plurality of entries;
means for loading the memory device with the corresponding actions associated with the two or more regular expressions.

16. The apparatus of claim 12, further comprising:
means for using a ternary content addressable memory (TCAM) for the CAM, each entry of the TCAM identifying a corresponding entry of the memory device.

17. An apparatus comprising:
a pattern matching engine having a plurality of information storage entries configured to store two or more regular expressions, each regular expression including a plurality of characters and associated with a corresponding action to be applied to a network message, the pattern matching engine configured to identify one or more borders within a regular expression, the one or more borders separating the regular expression into a plurality of sub-expressions, each sub-expression having a plurality of sequential characters, each entry of the plurality of entries of the pattern matching engine including the plurality of sequential characters from one of the sub-expressions of the plurality of subexpressions, the pattern matching engine configured to apply a string from a network message to the entries to search the string simultaneously in parallel for sub-expressions from each of the two or more regular expression and to determine that the plurality of sequential characters from the sub-expressions of at least one regular expression match the string, and then to execute the corresponding action associated with that at least one regular expression on the network message; and
a content addressable memory (CAM), the CAM configured to store the plurality of sequential characters from the plurality of sub-expressions.

18. The apparatus of claim 17, further comprising:
at least part of the CAM organized into a plurality of sections wherein each section is loaded with a plurality of search patterns for a corresponding sub-expression.

19. The apparatus of claim 17, further comprising:
the pattern matching engine configured to associate each sub-expression with a current state variable; and
the pattern matching engine configured to store each associated current state variable into a CAM entry that contains at least one sub-expression.

20. The apparatus of claim 17, further comprising:
a second memory device having a plurality of entries, the second memory device configured to store the corresponding actions associated with the two or more regular expressions.

21. The apparatus of claim 17, further comprising:
the CAM configured as a ternary content addressable memory (TCAM), the TCAM storing a corresponding entry for each entry of the second memory device.

22. A method for operating a pattern matching engine comprising the steps of:
obtaining two or more regular expressions;
identifying one or more borders within each regular expression using a deterministic finite state machine, the one or more borders separating the regular expression into a plurality of sub expressions, each sub expression including one or more characters, each border indicated by one or more predetermined metacharacters;
loading separate portions of a memory of the pattern matching engine with the sequential characters from each of the plurality of sub expressions of the two or more regular expressions;
applying a string from a network message to the memory to search the string in parallel for sub expressions from each of the two or more regular expression; and
determining that at least one of the two or more regular expressions matches the string and executing in response thereto a corresponding action associated with that regular expression;
wherein the memory is a content addressable memory (CAM).

23. The method of claim 22 wherein the step of loading further comprises the step of:
generating a plurality of search patterns for the sequential characters from each of the plurality of sub expressions and loading these search patterns into the separate portions of the memory.

24. The method of claim 22 wherein the deterministic finite state machine is constructed by combining separate deterministic finite state machines of each of the two or more regular expressions into a single deterministic finite state machine that identifies borders in the two or more regular expressions.

25. The method of claim 22 wherein the deterministic finite state machine is configured to parse regular expressions one character at a time.

26. The method of claim 25 wherein the deterministic finite state machine is configured to transition between states in response to valid character matches with parsed characters of regular expressions.

27. The method of claim 22 wherein the one or more predetermined metacharacters comprise a specific sequence of metacharacters.

28. The method of claim 27 wherein the specific sequence of metacharacters comprises a first regular expression metacharacter that defines a match to any one character followed by a second regular expression metacharacter defined to match a preceding element zero, one, or more than one times.

29. An apparatus comprising:
a pattern matching engine configured to obtain two or more regular expressions and to identify one or more borders within each regular expression using a deterministic finite state machine, the one or more borders separating the regular expression into a plurality of sub expressions, each sub expression including one or more characters, each border indicated by one or more predetermined metacharacters;
a memory of the pattern matching engine configured to store the sequential characters from each of the plurality of sub expressions of the two or more regular expressions in separate portions of memory, the memory further configured to, in response to application of a string from a network message, search the string in parallel for sub expressions from each of the two or more regular expression, and to determine that at least one of the two or more regular expressions matches the string; and
the pattern matching engine further configured to cause the execution of a corresponding action associated with that regular expression that matches;
wherein the memory is a content addressable memory (CAM).

30. The apparatus of claim 29 wherein the memory is further configured to store a plurality of search patterns for the sequential characters of each of the plurality of sub expressions.

31. The apparatus of claim 29 wherein the deterministic finite state machine is constructed by combining separate deterministic finite state machines of each of the two or more regular expressions into a single deterministic finite state machine that identifies borders in the two or more regular expressions.

32. The apparatus of claim 29 wherein the deterministic finite state machine is configured to parse regular expressions one character at a time.

33. The apparatus of claim 29 wherein the deterministic finite state machine is configured to transition between states in response to valid character matches with parsed characters of regular expressions.

34. The apparatus of claim 29 wherein the one or more predetermined metacharacters comprise a specific sequence of metacharacters.

35. The apparatus of claim 34 wherein the specific sequence of metacharacters comprises a first regular expression metacharacter that defines a match to any one character followed by a second regular expression metacharacter defined to match a preceding element zero, one, or more than one times.

* * * * *